Figure 1:
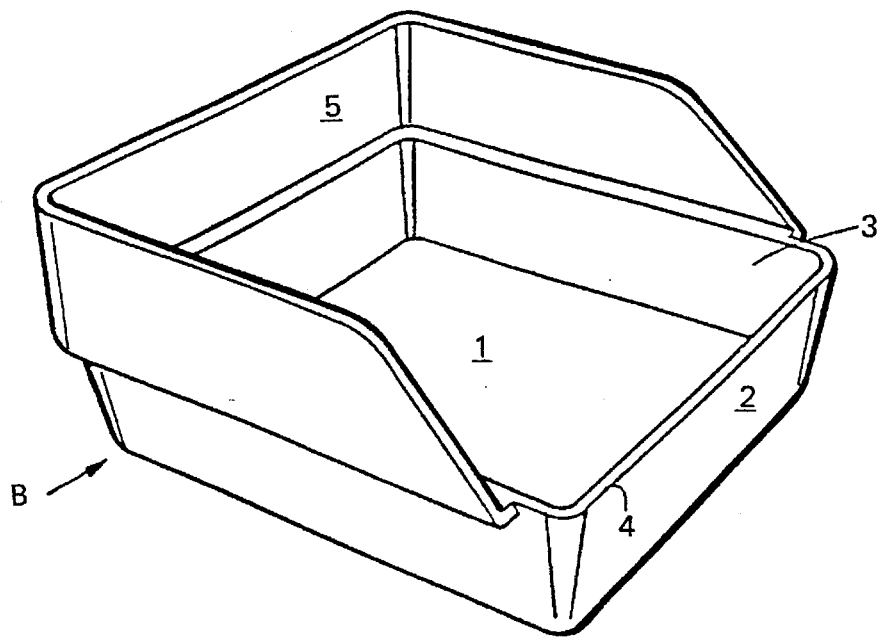

United States Patent [19]

Knight

[11] Patent Number: 5,615,639
[45] Date of Patent: Apr. 1, 1997

[54] FOLDABLE ASSEMBLY FOR CONTAINMENT AND DISPOSAL OF LITTER

[75] Inventor: John D. Knight, Sutton Coldfield, England

[73] Assignee: Arkimedes Limited, Cheshire, United Kingdom

[21] Appl. No.: 295,651

[22] PCT Filed: Apr. 29, 1992

[86] PCT No.: PCT/GB92/00788

§ 371 Date: Aug. 24, 1994

§ 102(e) Date: Aug. 24, 1994

[87] PCT Pub. No.: WO93/21757

PCT Pub. Date: Nov. 11, 1993

[51] Int. Cl.$^6$ .................................................. A01K 1/03
[52] U.S. Cl. .................................... 119/168; 220/667
[58] Field of Search .................... 119/165, 168; 229/108, 117.01; 220/666, 667

[56] References Cited

U.S. PATENT DOCUMENTS

| | | | |
|---|---|---|---|
| 1,652,844 | 12/1927 | Van Wormer | 229/117.01 |
| 2,904,239 | 9/1959 | Wilcox | 229/117.01 |
| 3,154,052 | 10/1964 | Sweeney | 119/168 |
| 4,047,499 | 9/1977 | Janecek | 119/168 |
| 4,709,827 | 12/1987 | Jaillet et al. | 119/168 |
| 4,766,845 | 8/1988 | Bavas | 119/165 |
| 4,813,376 | 3/1989 | Kaufmann et al. | |
| 5,144,914 | 9/1992 | Giannakopoulos | 119/168 |

FOREIGN PATENT DOCUMENTS

| | | | |
|---|---|---|---|
| 0108839 | 5/1984 | European Pat. Off. | |
| 223724 | 5/1987 | European Pat. Off. | 119/168 |
| 2613693 | 10/1988 | France | 119/168 |
| 2557540 | 6/1977 | Germany | |
| 658545 | 10/1951 | United Kingdom | |

*Primary Examiner*—Todd E. Manahan
*Attorney, Agent, or Firm*—Caesar, Rivise, Bernstein, Cohen & Pokotilow, Ltd.

[57] ABSTRACT

This disclosure relates to a tray containing litter for use by an animal. The tray is formed of plastics and comprises a planar floor having at least one deformation acting as a fold line and a plurality of upstanding sidewalls. Each of the sidewalls is free of any fold line and is connected to the floor to form an open compartment. Each of the sidewalls also comprises an upper edge. At least one complementary engagement means is disposed on each of the sidewalls. The complementary engagement means is integral with the sidewall. The tray is adapted in use to retain its shape and is foldable to a closed condition for disposal. The deformation is arranged to permit the tray to be folded to bring the upper edge of the adjacent sidewalls together to enable engagement of the complementary engagement means to seal the tray and the contained litter.

6 Claims, 4 Drawing Sheets

FOLDABLE ASSEMBLY FOR CONTAINMENT AND DISPOSAL OF LITTER

The invention relates to a tray to contain litter for use by animals, especially domestic pets such as cats. There is a need for a simple and clean way of disposing of used cat litter but despite the attempts of numerous workers, no proposal is satisfactory. Usually the job of disposing of used lavatorial animal litter is messy to the point that people will not bother. Instead they let the pet outdoors to relieve itself. Cats, when let out for lavatorial purposes, are exposed to many risks and this is not to be recommended.

It is one object of the invention to satisfy the long-felt need for a simple, clean and efficient way of disposing of used animal litter.

In one aspect the invention provides a tray to contain litter for use by an animal, the tray being adapted or arranged in use to retain its shape and being foldable to a closed condition, characterised in that the tray includes deformations arranged to permit the tray to be folded to bring opposite edges together to seal the tray.

In one preferred aspect the tray is formed e.g. vacuum formed of a plastics and has thin walls comprising a floor and upstanding sidewalls. The tray includes deformations arranged to permit the tray to be folded to bring opposite sides together, complementary engaging means being provided whereby the abutted walls can be inter-engaged so sealing the tray and its contents. Because such a tray has thin walls it is not self supporting and the invention provides a box therefor, the box having a compartment corresponding closely in shape and size to those of the tray whereby the tray is snugly supported e.g. so that a cat cannot claw the tray away from the supporting wall. In another aspect the invention provides a tray having relatively rigid walls (so that the box can be dispensed with), the tray including flexible areas whereby it may be folded as desired.

Preferably the tray is shaped to be foldable along a substantially diagonal axis to bring facing sides of the liner into abutting relation. Most preferably, the complementary engaging means are provided on the adjacent sides of the tray so that the abutted sides can be secured together. Such engaging means may comprise interlockable pegs and sockets; adhesive tapes; edges which can be folded over e.g. rolled over. In this way, a tray containing used animal litter may be disposed of in a sealed container.

The tray may be substantially square or oblong as seen in plan.

Figure 2:
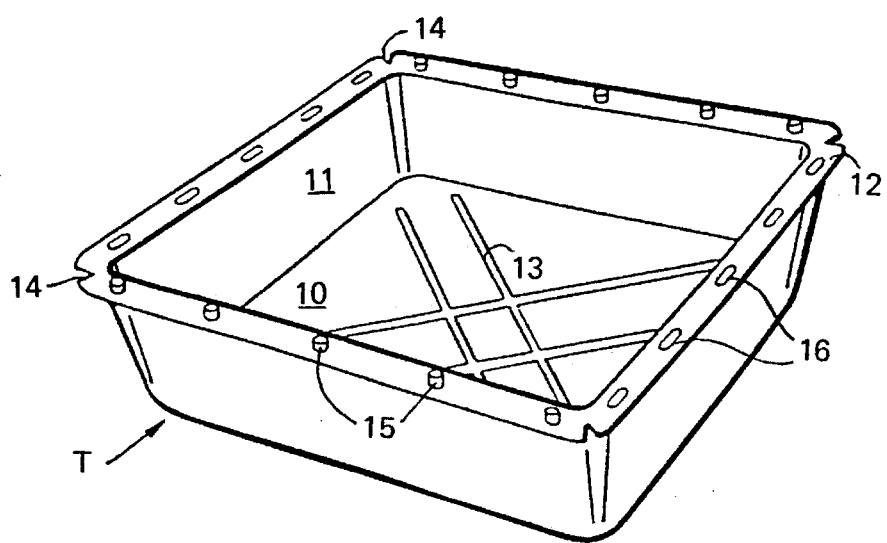
Figure 3:
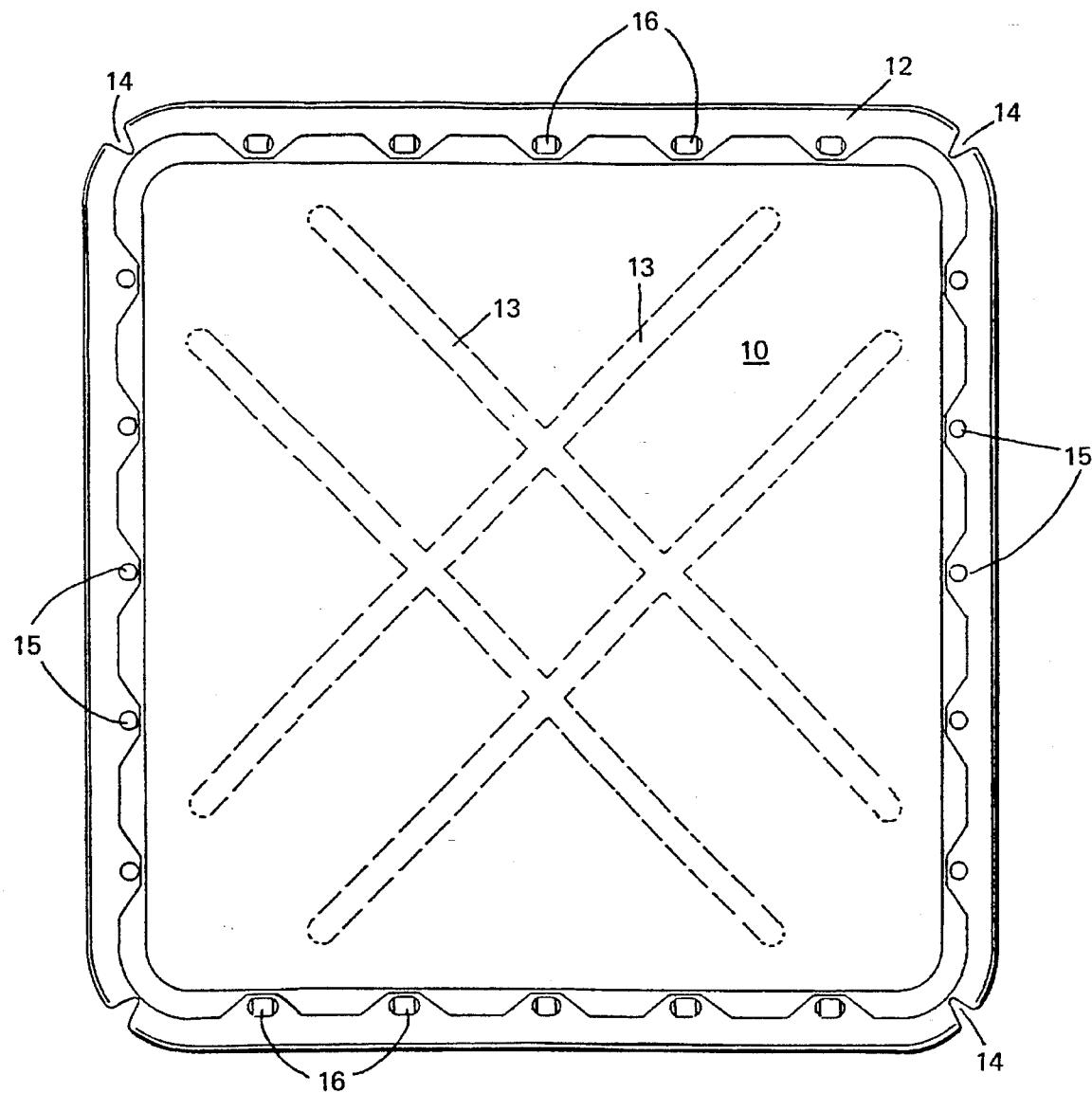
Figure 4:
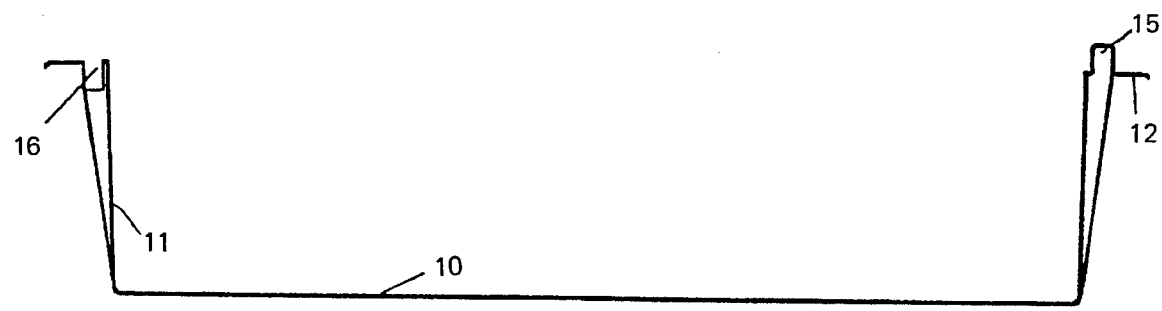
Figure 5:
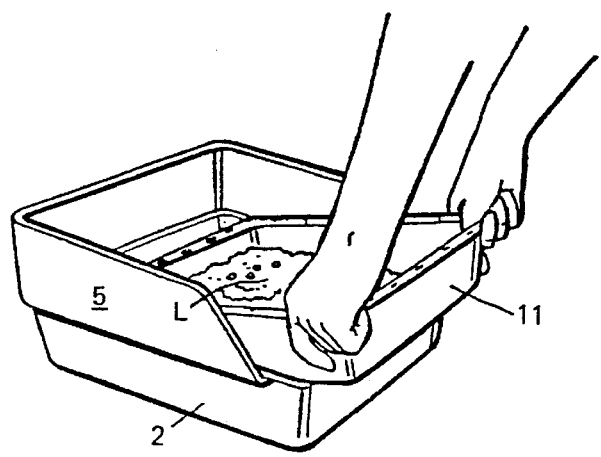
Figure 6:
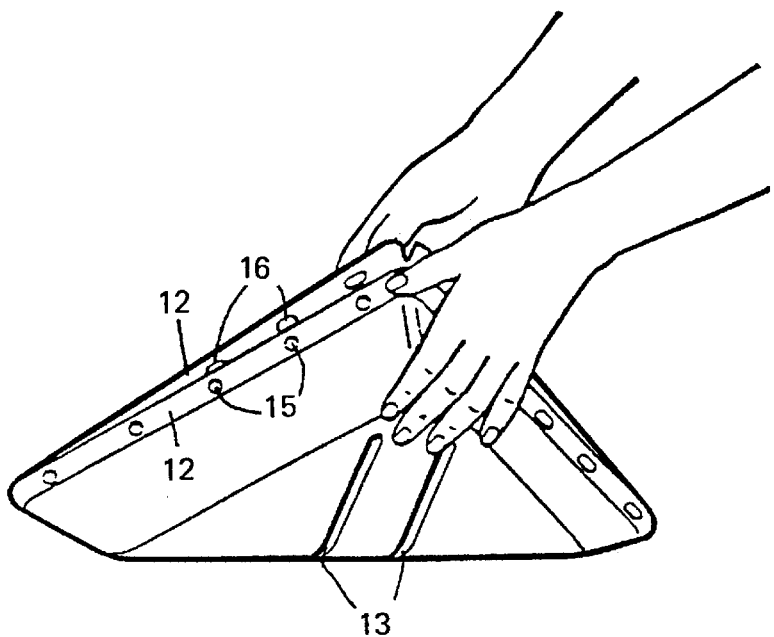
Figure 7:
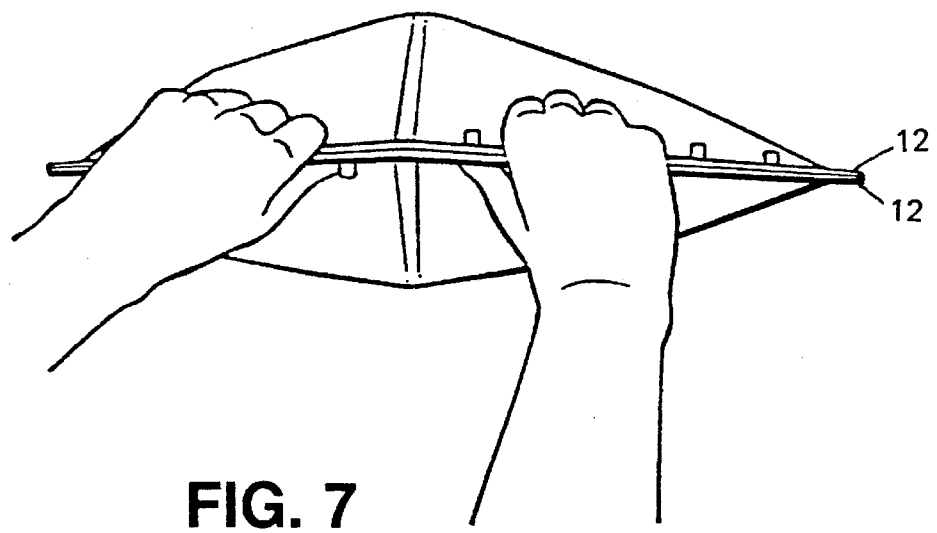

In order that the invention may be well understood it will now be described by way of example with reference to the accompanying drawings, in which:

FIG. 1 is a perspective view of an empty box,
FIG. 2 is a perspective view of a tray therefor,
FIG. 3 is a plan view of the tray,
FIG. 4 is a side sectional view of the tray,
FIG. 5 is a diagram showing removal of the filled tray from the box, and
FIGS. 6 and 7 show diagrammatically stages of sealing the tray into closed condition.

The litter box B of FIG. 1 is a relatively rigid structure and comprises a base having upstanding sidewalls 2 defining a compartment 3 of square section. The walls present a narrow ledge 4 about all four sides. A raised wall 5 is present about three sides of the box to retain litter etc.

The box contains a tray T formed e.g. by vacuum forming of a plastics. The tray has thin walls and comprises a floor 10 and four upstanding sidewalls 11 which end in an outwardly facing narrow ledge 12, which in use overlie the ledge 4 of the box B. The tray and the compartment 3 complement each other closely size and shape. As seen in FIGS. 2 and 3, depressions 13 are formed in the floor generally parallel to each diagonal axis. Each corner of the ledge 12 has a cut out 14. There are upstanding pegs 15 or complementary sockets 16 on the ledges of adjacent side walls of the tray T.

In use, the tray is partially filled with a natural or synthetic litter material L. (The level of litter is selected to be enough for the job but not too much that litter would escape when the tray is later folded.) Because of the snug fit of the tray T in the compartment 3, a cat cannot claw or scratch the tray wall away from the box. When the litter is in need of replacement the tray T is lifted out of the box B as shown in FIG. 5, allowing opposite corners to be grasped so that the tray T can be folded along a diagonal axis to the condition shown in FIG. 6. The folding is guided by the depressions 13 (which also prevent undue propagation of fold lines) and the cut outs 14. The pegs 15 are then pressed fitted into the respective sockets 16 so sealing the tray in an efficient and clean way. Because the tray tends to retain its shape as a result of the corners in the preformed shape, the tray is easier to fold than a plain bag or sheet, with little risk of escape of soiled litter. The sealed tray may then be discarded without the risk of mess or infection.

The system is simple to operate. The litter may be Fullers earth or a cheap substitute, e.g. peat, sawdust, sand, shredded paper.

The size of the box may be adjusted for single or multiple cat use. The tray may be oblong, hexagonal or other suitable shape as seen in plan. The system is useful to the domestic cat owner, the professional breeder, boarder or vet; the cat rescue operators; etc. The system may be used for other animals e.g. puppies.

I claim:

1. A tray to contain litter for use by an animal, the tray being formed of plastics and comprising:
   a. a floor having at least one deformation constituting a fold line;
   b. a plurality of upstanding sidewalls, each of said sidewalls being free of any fold lines and being connected to the floor to form an open compartment, each of said sidewalls having an upper edge; and
   c. at least one complementary engaging means disposed on each of said sidewalls, said complementary engaging means being engageable with a complementary engaging means disposed on another sidewall when the tray is folded at said at least one deformation, each of said complementary engagement means being integral with a respective sidewall, said tray being unfolded in use and being foldable at said at least one deformation to a closed condition for disposal of the tray containing soiled litter, each of said sidewalls closely abutting another of said sidewalls with the complementary engaging means on each sidewall engaged with the complementary engaging means on the abutting sidewall when said tray is in said closed condition.

2. A tray according to claim 1, wherein the tray is generally square as seen in plan.

3. A tray according to claim 1, wherein said abutting sidewalls are adjacent sidewalls.

4. The tray of claim 3 wherein said at least one deformation is disposed along a substantially diagonal axis of said floor.

5. A tray according to claim 1, wherein said complementary engaging means comprises interengagable pegs and sockets.

6. The tray of claim 5 wherein the complementary engaging means on one of said abutting sidewalls comprises pegs and the complementary engaging means on the other of said abutting side walls comprises sockets.

* * * * *